(12) United States Patent
Baartman et al.

(10) Patent No.: US 6,310,840 B1
(45) Date of Patent: Oct. 30, 2001

(54) OPTICAL SCANNING DEVICE COMPRISING A MAIN LENS AND AN AUXILIARY LENS

(75) Inventors: Jan P. Baartman; Jan W. Aarts, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/294,609

(22) Filed: Apr. 19, 1999

(30) Foreign Application Priority Data

Apr. 17, 1998 (EP) .................................................. 98201238

(51) Int. Cl.⁷ ........................................................ G11B 7/09
(52) U.S. Cl. .................................... 369/44.15; 369/112.25
(58) Field of Search .................................. 369/112, 44.23, 369/13, 44.14, 112.23, 112.24, 112.25, 112.26, 44.15, 44.22; 359/356, 368, 389, 819, 644, 822, 823, 824

(56) References Cited

U.S. PATENT DOCUMENTS

| | | | |
|---|---|---|---|
| 5,004,307 | * 4/1991 | Kino et al. | 359/356 |
| 5,712,842 | 1/1998 | Yamamoto et al. | 369/112 |
| 6,115,347 | * 9/2000 | Ichimura et al. | 369/112 |
| 6,130,789 | * 10/2000 | Aarts et al. | 359/819 |

* cited by examiner

Primary Examiner—Thang V. Tran

(57) ABSTRACT

An optical player includes an optical scanning device. The scanning device includes an optical lens system for focusing a light beam into a scanning spot on a track of an information carrier. The scanning device includes a first actuator for displacing the lens system parallel to an optical axis for focusing the light beam on the information carrier. The lens system includes a main lens or objective lens and an auxiliary or solid immersion lens, providing the lens system with a large numerical aperture, so that the scanning device is suitable for scanning information carriers with a high information density, such as, for example, high density compact discs. The auxiliary lens is secured in a fixed position to a housing of the lens system, while the main lens is suspended in the housing in a direction parallel to the optical axis by an elastically deformable mounting unit. The lens system includes a second actuator for moving the main lens relative to the auxiliary lens in a direction parallel to the optical axis for compensating for spherical aberration in a transparent protection layer of the information carrier. Thus, the necessary power of the first actuator is limited considerably.

19 Claims, 4 Drawing Sheets

OPTICAL SCANNING DEVICE COMPRISING A MAIN LENS AND AN AUXILIARY LENS

FIELD OF THE INVENTION

The invention relates to the field of optical scanning of high density disk-like information carriers.

BACKGROUND OF THE INVENTION

The invention relates to an optical scanning device for scanning an information track of an optically scannable information carrier, which scanning device includes a radiation source, an optical lens system with an optical axis for focusing a radiation beam supplied, in operation, by the radiation source into a scanning spot on the information carrier, and a first actuator for moving the lens system parallel to the optical axis, the lens system being provided with a main lens, an auxiliary lens, and a second actuator for moving the main lens and the auxiliary lens relative to each other.

The invention further relates to an optical lens system which can suitably be used in an optical scanning device in accordance with the invention.

The invention also relates to an optical player including a table which can be rotated about an axis of rotation, an optical scanning device for scanning an information track of an optically scannable information carrier which can be placed on the table, and a displacement device by means of which the scanning device can be moved, in operation, mainly in a radial direction relative to the axis of rotation.

An optical scanning device and an optical player of the types mentioned in the opening paragraphs are known from U.S. Pat. No. 5,712,842. The main lens of the optical lens system of the known optical scanning device is an objective lens, while the auxiliary lens is a relatively small, so-called solid immersion lens which is arranged between the objective lens and the information carrier to be scanned. By using the auxiliary lens, the lens system of the known scanning device has a relatively large numerical aperture, so that a relatively small scanning spot on the information carrier to be scanned is obtained. By virtue thereof, the known scanning device can suitably be used to scan information carriers having relatively small elementary information characteristics, that is information carriers having a relatively high information density, such as a high-density CD. By means of the first actuator of the known scanning device, the main lens and the auxiliary lens are jointly moved parallel to the optical axis, so that the scanning spot can be focused on the information layer of the information carrier. By means of the second actuator of the known scanning device, the auxiliary lens is moved relative to the main lens in a direction parallel to the optical axis, so that a spherical aberration of the radiation beam in a transparent protective layer of the information carrier present between the information layer and the scanning device can be corrected.

The above citation is hereby incorporated herein in whole by reference.

SUMMARY OF THE INVENTION

The inventors have recognized that a drawback of the known optical scanning device and the known optical player is that, as a result of the relatively large mass of the main lens, the first actuator must supply relatively large accelerating forces to correct high-frequency focusing errors which occur as a result of surface deviations present in the information layer of the information carrier to be scanned, in the direction of the information track to be scanned. As a result, the first actuator must have a relatively high power.

It is an object of the invention to provide an optical scanning device and an optical player of the types mentioned in the opening paragraphs, in which the accelerating forces, to be supplied by the first actuator, for correcting high-frequency focusing errors are limited, so that the necessary power of the first actuator is limited.

In the optical scanning device in accordance with the invention the auxiliary lens is secured in a fixed position to a housing of the lens system, which housing can be moved parallel to the optical axis by the first actuator, while the main lens, viewed parallel to the optical axis, is elastically suspended in the housing by means of an elastically deformable mounting unit, the main lens being movable relative to the housing by the second actuator in a direction parallel to the optical axis.

In operation, by displacements of the lens system parallel to the optical axis, both low-frequency focusing errors which have a relatively large amplitude and occur as a result of an oblique position of the information carrier to be scanned relative to the optical axis and/or by unevenness of the information carrier, and high-frequency focusing errors which have a relatively small amplitude and occur as a result of surface deviations present in the information layer of the information carrier in the direction of the information track to be scanned, must be corrected. Since the acceleration of the lens system is proportional to the amplitude of the focusing errors to be corrected and proportional to the square of the frequency of the focusing errors to be corrected, the accelerations of the lens system necessary to correct the high-frequency focusing errors are relatively large relative to the accelerations of the lens system necessary for correcting the low-frequency focusing errors. The elastically deformable mounting unit has a stiffness which, viewed parallel to the optical axis, is such that the main lens substantially completely follows the displacements of the lens system necessary to correct the relatively large low-frequency focusing errors, and substantially does not follow the displacements of the lens system necessary to correct the relatively small high-frequency focusing errors. In this manner it is achieved that the total mass, which is to be displaced by the first actuator to correct the small high-frequency focusing errors, is limited to mainly the mass of the housing of the lens system and the mass of the auxiliary lens, so that the accelerating forces for correcting the high-frequency focusing errors, which forces are to be supplied by the first actuator, and the necessary power of the first actuator are limited. The elastically deformable mounting unit also serves as a bearing of the main lens in the housing of the lens system.

In a particular embodiment of an optical scanning device in accordance with the invention, the mounting unit of the lens system includes two mounting elements which, viewed parallel to the optical axis, are arranged at some distance from each other and extend transversely to the optical axis, each mounting element, viewed parallel to the optical axis, being elastically deformable and, viewed at right angles to the optical axis, being mainly undeformable. By using the two mounting elements, viewed at right angles to the optical axis, a very rigid bearing of the main lens relative to the housing is achieved. By the co-operation between the two mounting elements, in addition, tilting of the main lens relative to the housing about tilting axes directed at right angles to the optical axis is precluded. In this manner, undesirable displacements of the main lens relative to the auxiliary lens, at right angles to the optical axis, and undesirable tilting of the main lens relative to the auxiliary lens about tilt axes directed at right angles to the optical axis are precluded, while displacements of the main lens relative to the auxiliary lens in a direction parallel to the optical axis are possible, thereby elastically deforming both mounting elements.

In a further embodiment of an optical scanning device in accordance with the invention is characterized in that the mounting elements are each provided with a first, substantially ring-shaped part which is secured to the housing, and a second substantially ring-shaped part which is secured to the main lens, the ring-shaped parts of a first one of the mounting elements being interconnected by at least three bendable bridges extending in a plane transverse to the optical axis and being arranged at regular distances from each other, while the ring-shaped parts of a second one of the mounting elements are interconnected by at least two bendable bridges extending in a plane transverse to the optical axis. If the first mounting element has three bendable bridges and the second mounting element has two bendable bridges, then a so-called statically determined, that is substantially stress-free suspension of the main lens in the housing is achieved, the main lens being displaceable exclusively parallel to the optical axis. If a larger number of bendable bridges is used, the suspension of the main lens in the housing is not statically determined, but the main lens can still be displaced in a direction parallel to the optical axis.

In a still further embodiment of an optical scanning device in accordance with the invention, the first mounting element and the second mounting element each includes three bendable bridges mutually arranged at regular interspaces. In this further embodiment, two identical mounting elements can be used, so that the construction of the lens system of the optical scanning device is simplified.

In a particular embodiment of an optical scanning device in accordance with the invention, the bendable bridges of the mounting elements each includes a uniformly bendable spoke which extends substantially in a tangential direction relative to the optical axis. By using the uniformly bendable spokes, a simple and robust construction of the mounting elements is achieved.

In a further embodiment of an optical scanning device in accordance with the invention, the bendable bridges of the mounting elements each include a relatively rigid strip which extends mainly in a tangential direction relative to the optical axis and is connected, via two flexible joints, to the two ring-shaped parts of the relevant mounting element. By using the strips and flexible joints, the mounting elements can be manufactured in a simple manner by providing a number of incisions.

In a particular embodiment of an optical scanning device in accordance with the invention, the housing of the lens system includes three parts which are fixed relative to each other, the auxiliary lens being secured to a first one of the three parts, the first mounting element being secured to a second one of the three parts, and the second mounting element being secured to a third one of the three parts. By moving the three parts relative to each other by means of a manipulator, during the manufacture of the lens system, the main lens and the auxiliary lens can be aligned relative to each other. By moving the second and the third part over equal distances relative to the first part in an equal direction at right angles to the optical axis, the main lens and the auxiliary lens can be centered relative to each other. By moving the second and the third part over equal distances, in opposite directions, at right angles to the optical axis, relative to the first part, the main lens and the auxiliary lens can be directed so as to be parallel to each other. After aligning the main lens and the auxiliary lens relative to each other, the three parts of the housing are fixed relative to each other.

In a further embodiment of an optical scanning device in accordance with the invention, the second actuator belonging to the lens system is arranged, viewed parallel to the optical axis, between the two mounting elements. In this manner, the available space between the two mounting elements is efficiently used, so that a compact construction of the lens system is obtained.

In yet another embodiment of an optical scanning device in accordance with the invention, the second actuator is provided with two ring-shaped permanent magnets which, viewed parallel to the optical axis, are secured, next to one another, to a substantially ring-shaped magnetic closing yoke belonging to the housing, and which, relative to the optical axis, are magnetized in opposite radial directions, and with two ring-shaped electric coils which are secured to a substantially ring-shaped non-magnetizable holder of the main lens, the coils, viewed parallel to the optical axis, being arranged next to one another, opposite the two magnets, and wound in opposite directions. The second actuator thus constructed has a favorable ratio between the maximum electromagnetic force that can be supplied and the necessary dimensions of the magnets and the electric coils. The ring-shaped magnets and coils can be accommodated, in a practical manner, in the available space between the two mounting elements. By securing the coils to the abovementioned nonmagnetizable holder of the main lens, an undesirable radial magnetic attractive force between the magnets and the holder is prevented, so that mechanical loads of the mounting elements in radial directions are precluded to the extent possible.

In a particular embodiment of an optical scanning device in accordance with the invention, the magnetic closing yoke constitutes the third part of the housing. In this manner, a practical and efficient embodiment of the magnetic closing yoke of the second actuator is obtained.

These and other aspects of the invention will be apparent from and elucidated with reference to the embodiments described hereinafter.

DETAILED DESCRIPTION OF THE PREFERRED EMBODIMENT

Figure 1:
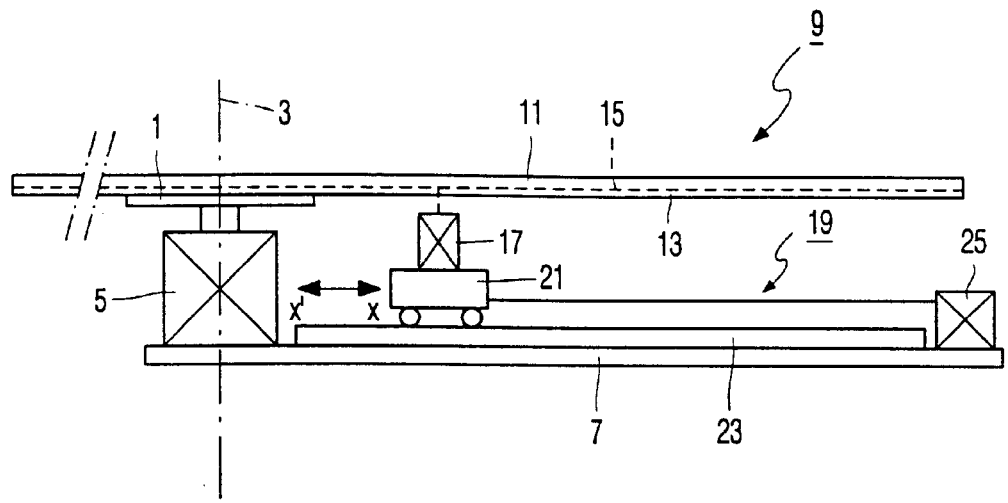
FIG. 1 schematically shows an optical player in accordance with the invention.

FIG. 1 schematically shows an optical player in accordance with the invention, which includes a table 1 which can be rotated about an axis of rotation 3 and can be driven by an electric motor 5 which is secured onto a frame 7. On table 1, an optically scannable information carrier 9, such as a CD, can be arranged which is provided with a disc-shaped support 11 and a transparent protective layer 13. A side of the support 11 bordering on the protective layer 13 forms an information layer 15 of the information carrier 9 on which a spiral-shaped information track is present. The optical player further includes an optical scanning device 17 in accordance with the invention for optically scanning the information track of the information carrier 9. Scanning device 17 can be displaced by means of a displacement device 19 of the optical player relative to the axis of rotation 3 predominantly in two opposite radial directions X and X'. To this end, the scanning device 17 is secured to a slide 21 of the displacement device 19 which is further provided with a straight guide 23 provided on the frame 7 and extending parallel to the X direction, over which guide the slide 21 is guided in a displaceable manner, and an electric motor 25 by means of which the slide 21 can be displaced over the guide 23. In operation, an electrical control unit of the optical player, not shown in the Figures, controls the motors 5 and 25, causing the information carrier 9 to rotate about the axis of rotation 3, and simultaneously, the scanning device 17 to be displaced parallel to the X-direction, in such a manner that the spiral-shaped information track present on the information carrier 9 is scanned by the scanning device 17. During scanning, information present on the information track can be read by the scanning device 17 or information can be written on the information track by the scanning device 17.

Figure 2:
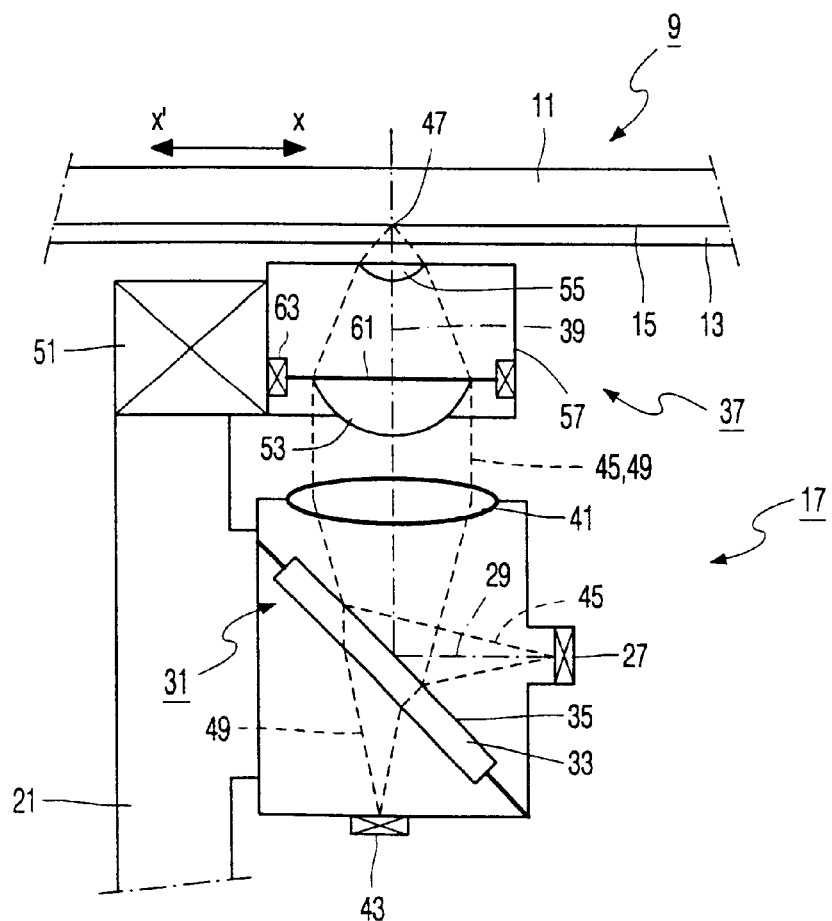
FIG. 2 schematically shows an optical scanning device in accordance with the invention, which is used in the optical player in accordance with FIG. 1.

The optical scanning device 17 in accordance with the invention, used in the optical player in accordance with the invention is schematically shown in FIG. 2. The scanning device 17 is provided with a radiation source 27, for example a semiconductor laser, with an optical axis 29. The scanning device 17 further includes a radiation beam splitter 31 which includes a transparent plate 33 which is arranged at an angle of 45° relative to the optical axis 29 of the radiation source 27 and which includes a reflective surface 35 facing the radiation source 27. The scanning device 17 further includes an optical lens system 37 with an optical axis 39 and a collimator lens 41 arranged between the radiation beam splitter 31 and the lens system 37. The optical axis 39 of the lens system 37 and the optical axis 29 of the radiation source 27 include an angle of 90°. The scanning device 17 further includes an optical detector 43 which, relative to the lens system 37, is arranged behind the radiation beam splitter 31, the optical detector being of a type which is known per se and customarily used. In operation, the radiation source 27 generates a radiation beam 45 which is reflected by the reflective surface 35 of the radiation beam splitter 31 and focused by the lens system 37 into a scanning spot 47 on the information layer 15 of the information carrier 9. The radiation beam 45 is reflected by the information layer 15 into a reflected radiation beam 49 which is focused on the optical detector 43 via the lens system 37, the collimator lens 41 and the radiation beam splitter 31. For reading information present on the information carrier 9, the radiation source 27 generates a continuous radiation beam 45, and the optical detector 43 supplies a detection signal which corresponds to a series of elementary information characteristics on the information track of the information carrier 9, which elementary information characteristics are successively present in the scanning spot 47. For writing information on the information carrier 9, the radiation source 27 generates a radiation beam 45 which corresponds to the information to be written, in the scanning spot 47 a series of successive elementary information characteristics being generated on the information track of the information carrier 9.

As is also shown in FIG. 2, the scanning device 17 includes a first actuator 51 by means of which the lens system 37 can be displaced over relatively small distances parallel to the optical axis 39 of the lens system 37, and over relatively small distances parallel to the X-direction. By displacing the lens system 37 by means of the first actuator 51 in a direction parallel to the optical axis 39, the scanning spot 47 is focused with a desired degree of accuracy on the information layer 15 of the information carrier 9. By displacing the lens system 37 by means of the first actuator 51 in a direction parallel to the X-direction, the scanning spot 47 is maintained with a desired accuracy on the information track to be followed. To this end, the first actuator 51 is driven by the above-mentioned control unit of the optical player, which receives both a focus-error signal and a track-error signal from the optical detector 43.

Figure 3:
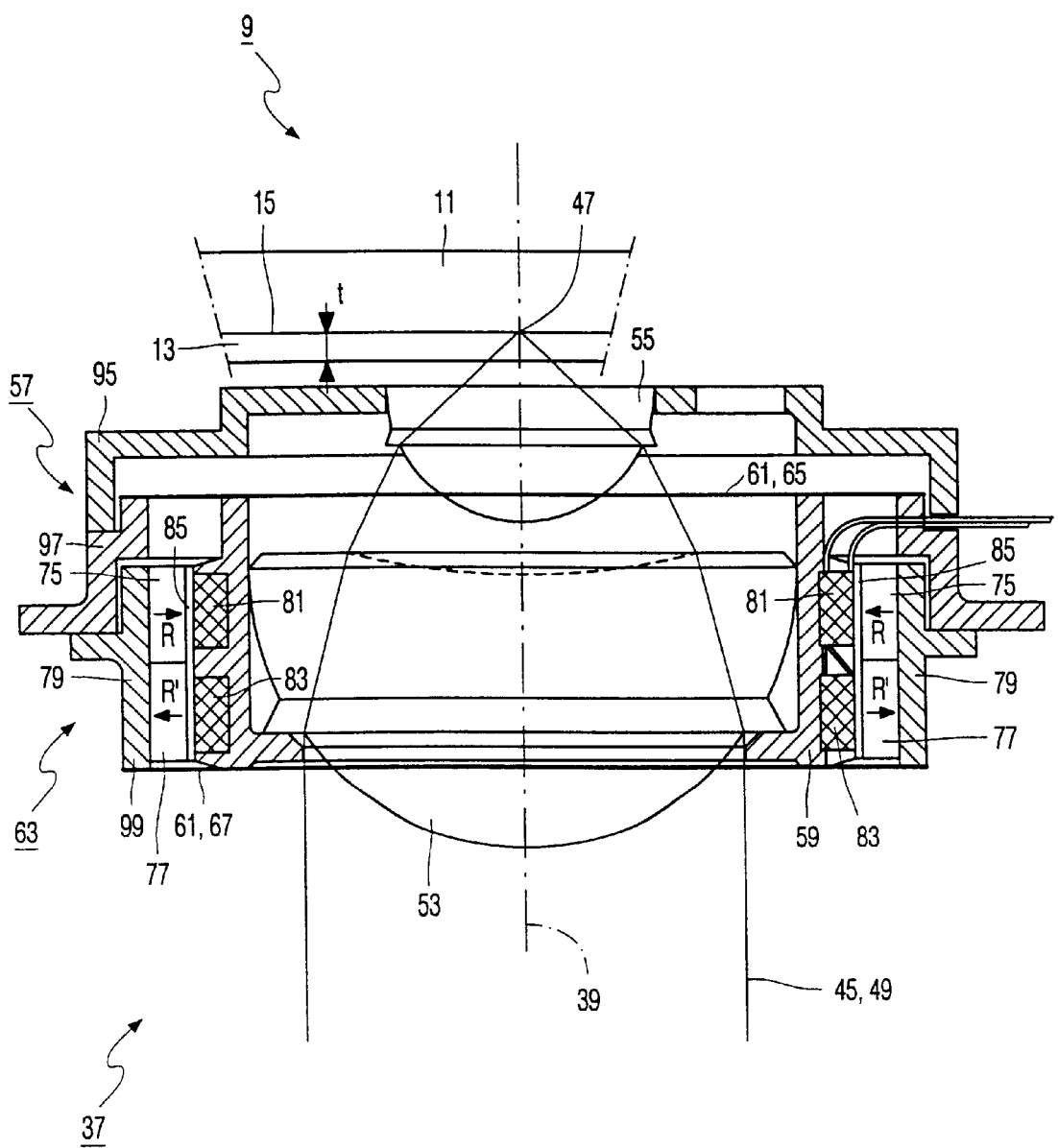
FIG. 3 shows an optical lens system in accordance with the invention, which is used in the optical scanning device in accordance with FIG. 2.

The optical lens system 37 used in the optical scanning device 17 is shown in detail in FIG. 3 and includes a first lens element 53 and a second lens element 55. The first lens element 53 is an objective lens and constitutes a main lens of the lens system 37. The second lens element 55 is a so-called solid immersion lens, which is arranged between the objective lens and the information carrier 9 to be scanned, and which constitutes a relatively small auxiliary lens of the lens system 37. By employing, apart from the main lens 53, auxiliary lens 55, the lens system 37 has a relatively large numerical aperture, so that the scanning spot 47 on the information layer 15 of the information carrier 9 is relatively small. As a result, the scanning device 17 is suitable for scanning optical information carriers having relatively small elementary information characteristics, i.e. optical information carriers having a relatively high information density, such as a high-density CD. As shown in FIG. 3, the auxiliary lens 55 is secured in a fixed position to a housing 57 of the lens system 37, which housing 57 is secured to the first actuator 51 and hence can be displaced parallel to the optical axis 39 of the lens system 37 by means of the first actuator 51. The main lens 53 is secured to a substantially ring-shaped holder 59 which, viewed parallel to the optical axis 39, is elastically suspended in the housing 57 by means of an elastically deformable mounting unit 61, which will be described in greater detail hereinbelow, said main lens 53 being displaceable, parallel to the optical axis 39, relative to the housing 57, thereby elastically deforming mounting unit 61. As shown in FIG. 3, the lens system 37 further includes a second actuator 63, which will be described in greater detail hereinbelow, by means of which the main lens 53 can be displaced, parallel to the optical axis 39 of the lens system 37, relative to the housing 57 and the auxiliary lens 55. By displacing the main lens 53 relative to the auxiliary lens 55, in a direction parallel to the optical axis 39, by means of the second actuator 63, a spherical aberration of the radiation beam 45 in the transparent protective layer 13 of the information carrier 9 is corrected. Such a spherical aberration is predominantly caused by fluctuations in the thickness t of the protective layer 13. The second actuator 63 is also driven by the control unit of the optical player, which receives an error signal from a sensor of the scanning device 17, not shown in the Figures for the sake of simplicity, by means of which sensor, for example, the thickness t of the protective layer 13 near the scanning spot 47 can be measured.

Figure 4:
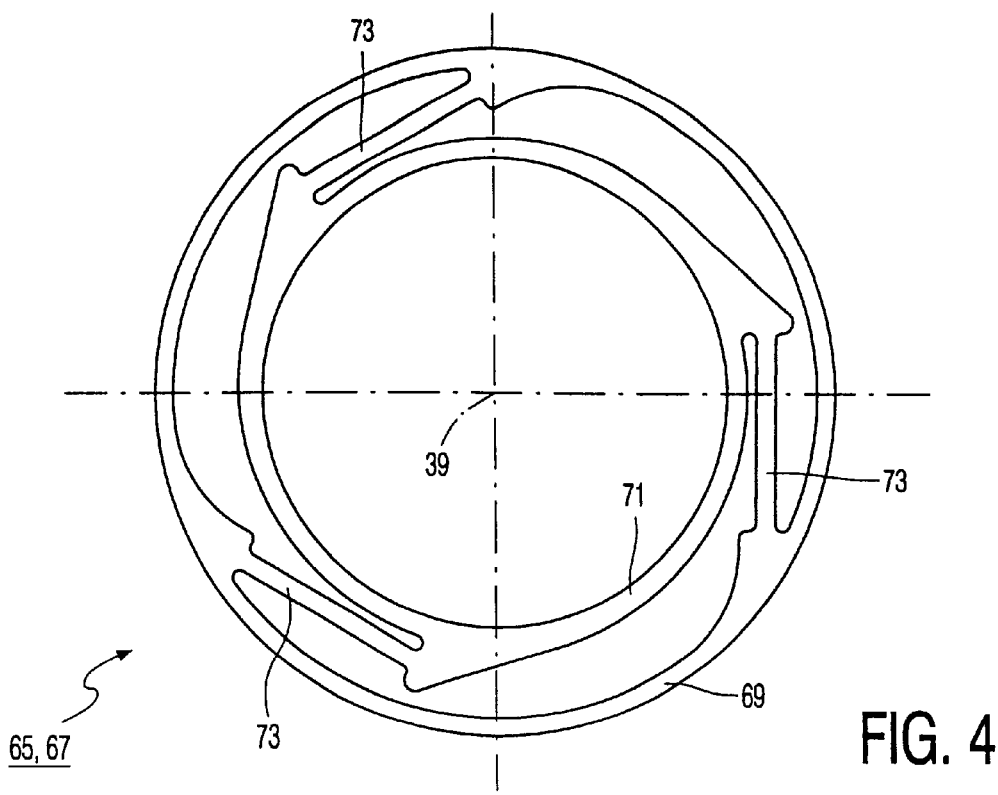
FIG. 4 shows an elastically deformable mounting element of the optical lens system in accordance with FIG. 3.

As shown in FIG. 3, the mounting unit 61 includes two mounting elements 65, 67 which, viewed parallel to the optical axis 39, are arranged at a distance from each other and extend transversely to the optical axis 39. The mounting elements 65, 67, which are identical and shown in detail in FIG. 4, are, viewed at right angles to the optical axis 39, substantially undeformable and, viewed parallel to the optical axis 39, elastically deformable. For this purpose, as shown in FIG. 4, the mounting elements 65, 67 are each provided with a first, predominantly ring-shaped portion 69 which is secured to the housing 57 of the lens system 37, and a second, predominantly ring-shaped portion 71 which is secured to the holder 59 of the main lens 53, ring-shaped portions 69 and 71 being interconnected by three bendable bridges 73 which extend in a plane transverse to the optical axis 39 and are mutually placed at regular intervals. By using the two mounting elements 65, 67, the main lens 53 is given, viewed parallel to the optical axis 39, a freedom of displacement, while, viewed at right angles to the optical axis 39, a relatively rigid bearing of the main lens 53 relative to the housing 57 is obtained. The co-operation between the two mounting elements 65, 67 additionally provides the mounting unit 61 with a relatively high tilt resistance about every tilt axis directed perpendicularly to the optical axis 39, so that tilting of the main lens 53 relative to the housing 57 about tilt axes directed at right angles to the optical axis 39 is precluded as much as possible. By virtue thereof, it is achieved that an alignment of the main lens 53 and the auxiliary lens 55 relative to each other, which is obtained during the manufacture of the lens system 37, and as a result of which the optical axes of the main lens 53 and the auxiliary lens 55 coincide as much as possible, is maintained in operation to the extent possible.

As shown in FIG. 3, the second actuator 63, viewed parallel to the optical axis 39, is arranged between the two mounting elements 65, 67 of the mounting unit 61, so that the space available between the two mounting elements 65, 67 is efficiently used and a compact construction of the lens system 37 is obtained. The actuator 63 has two ring-shaped permanent magnets 75, 77 which, viewed parallel to the optical axis 39, are arranged one beside the other and secured to a substantially ring-shaped closing yoke 79, which is made of a magnetizable material and constitutes a separate part of the housing 57 of the lens system 37. The actuator 63 further includes two ring-shaped electric coils 81, 83 which are secured to the holder 59 of the main lens 53. Viewed parallel to the optical axis 39, the coils 81, 83 are also arranged one beside the other, the coil 81 being arranged opposite the magnet 75 and the coil 83 being arranged opposite the magnet 77, while a ring-shaped air gap 85 is present between the magnets 75, 77 and the coils 81, 83. As shown in FIG. 3, the magnets 75, 77 are magnetized, relative to the optical axis 39, in opposite radial directions R and R'. The coils 81, 83 are wound in opposite directions relative to each other, so that, in operation, an electric current in the coil 81 and an electric current in the coil 83 flow in opposite directions. In this manner, it is achieved that the electromagnetic forces which, in operation, are exerted on the coils 81 and 83 by an interaction between a magnetic field of the magnets 75, 77 and the electric current in the coils 81, 83 are substantially equally directed. The holder 59 is made of a non-magnetizable material, so that the magnets 75, 77 do not exert magnetic forces on the holder 59, and mechanical loads on the mounting elements 65, 67, which are directed at right angles to the optical axis 39, are limited as much as possible.

In operation, during scanning the information track of the information carrier 9, both low-frequency focusing errors and high-frequency focusing errors occur, which must all be corrected by displacing the lens system 37 in a direction parallel to the optical axis 39 by means of the first actuator 51. The low-frequency focusing errors are caused, for example, by an oblique position of the information carrier 9 relative to the axis of rotation 3 of the table 1 or by a curvature of the information layer 15 of the information carrier 9, and hence the low focusing errors have a relatively large amplitude and a frequency corresponding to a rotational frequency of the table 1. The high-frequency focusing errors are caused by relatively small surface deviations present on the information layer 15 of the information carrier 9 in the direction of the information track to be scanned, and hence the high-frequency focusing errors have a relatively small amplitude and a relatively high frequency. The accelerations of the lens system 37, which must be generated by the first actuator 51 in order to correct the focusing errors, are substantially proportional to the amplitude of the focusing errors to be corrected and proportional to the square of the frequency of the focusing errors to be corrected, so that the accelerations of the lens system 37, which are to be generated to correct the high-frequency focusing errors, are relatively large relative to the accelerations of the lens system 37 to be generated for correcting the low-frequency focusing errors. Viewed parallel to the optical axis 39, the two mounting elements 65 and 67 of the lens system 37 have a mechanical rigidity such that the main lens 53 can substantially completely follow displacements of the housing 57 of the lens system 37 in a direction parallel to the optical axis 39 at a frequency comparable to a frequency of the low-frequency focusing errors, and such that the main lens substantially cannot follow displacements of the housing 57 of the lens system 37 in a direction parallel to the optical axis 39 at a frequency comparable to a frequency of the high-frequency focusing errors. Such mechanical rigidity of the mounting elements 65 and 67 can be achieved, for example, by suitably dimensioning the bendable bridges 73 of the mounting elements 65, 67. Thus, the first actuator 51, upon correcting the low-frequency focusing errors, displaces the entire lens system 37 parallel to the optical axis 39, while upon correcting the high-frequency focusing errors, mainly, the housing 57, the auxiliary lens 55 and the magnets 75, 77 of the second actuator 63 are displaced parallel to the optical axis 39. The mass of the main lens 53 constitutes an important part of the overall mass of the lens system 37, so that in this manner the mass to be displaced by the first actuator 51 upon correcting the high-frequency focusing errors is reduced considerably, and hence the accelerating forces to be supplied by the first actuator 51 and the necessary power of the first actuator 51 are reduced considerably. In this manner, the high-frequency focusing errors are substantially exclusively corrected by means of relatively small displacements of the auxiliary lens 55 in a direction parallel to the optical axis 39, which, in practice, proved possible because the high-frequency focusing errors only have a relatively small amplitude. In addition, it has been found that such small displacements of only the auxiliary lens 55 have almost no influence on the spherical aberration of the radiation beam 45 in the protective layer 13 of the information carrier 9, so that the displacements of the auxiliary lens 55 almost do not have to be compensated by displacements of the main lens 53 relative to the auxiliary lens 55 by means of the second actuator 63.

Figure 5:
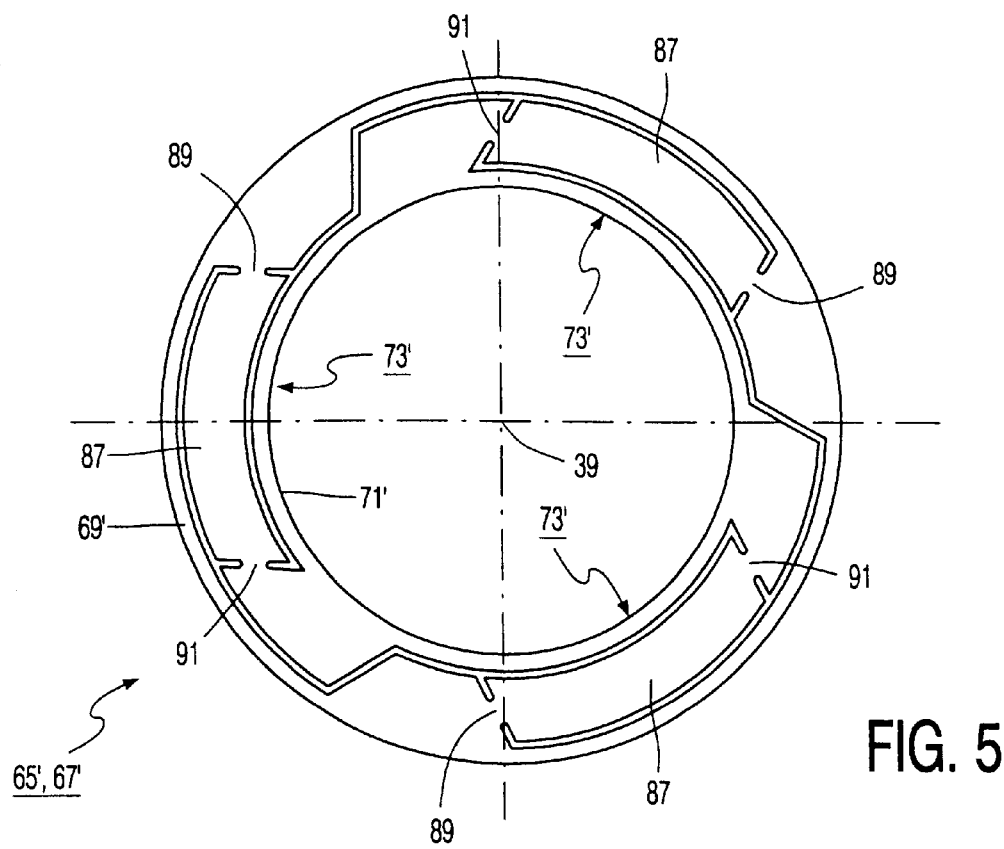
FIG. 5 shows an alternative elastically deformable mounting element of the optical lens system in accordance with FIG. 3, and FIGS. 6a and 6b schematically show how a main lens and an auxiliary lens of the optical lens system in accordance with FIG. 3 can be aligned with respect to each other during the manufacture of the lens system.

As described hereinabove, the mounting elements 65, 67 of the lens system 37 each includes three bendable bridges 73, which extend in a plane transverse to the optical axis 39 and which are mutually placed at regular intervals. As shown in FIG. 4, the bendable bridges 73 each includes a uniformly bendable spoke which extends substantially in a tangential direction relative to the optical axis 39 of the lens system 37. As a result, a simple and robust construction of the mounting elements 65, 67 is obtained. FIG. 5 shows an alternative mounting element 65', 67' which may be used in the lens system 37 instead of the mounting element 65, 67 shown in FIG. 4. The alternative mounting element 65', 67' includes, just like the mounting element 65, 67, a first predominantly ring-shaped portion 69' which is secured to the housing 57 of the lens system 37, and a second predominantly ring-shaped portion 71', which is secured to the holder 59 of the main lens 53. The ringshaped portions 69', 71' of the alternative mounting element 65', 67' shown in FIG. 5 are interconnected by three bendable bridges 73', which extend in a plane transverse to the optical axis 39 and are mutually placed at regular intervals, each of the bendable bridges including a relatively rigid strip 87 which extends predominantly in a tangential direction relative to the optical axis 39 and is connected, via two flexible joints 89, 91, to the two ring-shaped portions 69', 71'. By using said strips 87 and said flexible joints 89, 91, the mounting elements 65', 67' can be manufactured in a simple manner by providing a relatively small number of incisions in a sheet material.

The above-described mounting elements 65, 67, 65', 67' each include three bendable bridges 73, 73'. It is noted that, in accordance with the invention, the mounting elements 65, 67, 65', 67' may alternatively include a different number of bendable bridges 73, 73'. In accordance with the invention, however, a first one of the mounting elements 65, 67, 65', 67' should include at least three bendable bridges 73, 73' which extend in a plane transverse to the optical axis 39 and are arranged at regular distances from each other, and a second one of the mounting elements 65, 67, 65', 67' should include at least two bendable bridges 73, 73' which extend in a plane transverse to the optical axis 39. If the first mounting element 65, 67, 65', 67' is provided, as described above, with three bendable bridges 73, 73', and the second mounting element 65, 67, 65', 67' is provided, as described above, with two bendable bridges 73, 73', a so-called statically determined, i.e. substantially stress-free, suspension of the main lens 53 in the housing 57 is obtained, in which case the main lens 53 can only be displaced parallel to the optical axis 39. This is based on the recognition that each individual bendable bridge 73, 73' serves mainly as a mechanical rod by means of which substantially only forces directed parallel to a longitudinal direction of the bendable bridge 73, 73' are transmitted. If the mounting elements 65, 67, 65', 67' include a larger number of bendable bridges 73, 73', a suspension of the main lens 53 in the housing 57 is achieved which is not statically determined, but the main lens 53 can be displaced parallel to the optical axis 39 just the same.

Figure 6A:
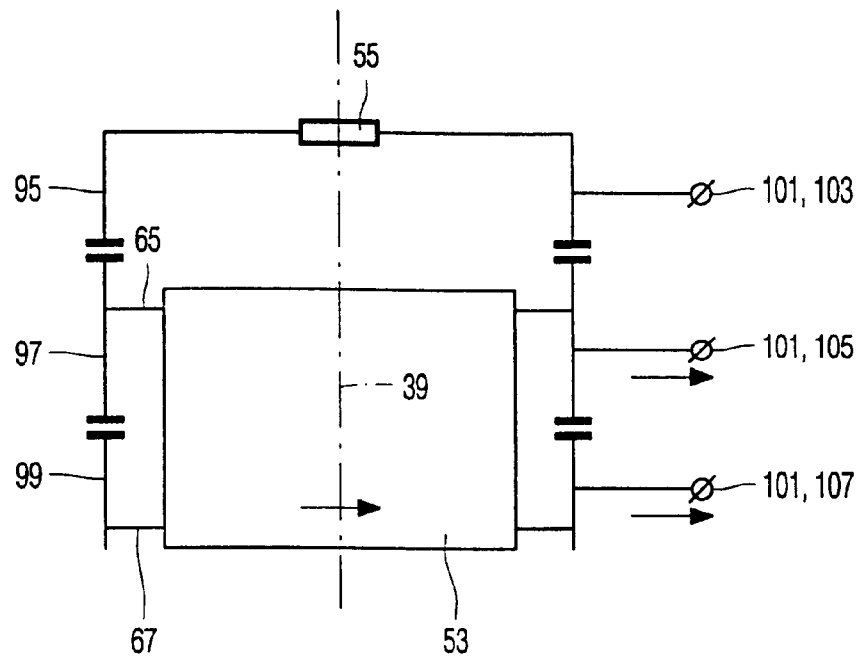
Figure 6B:
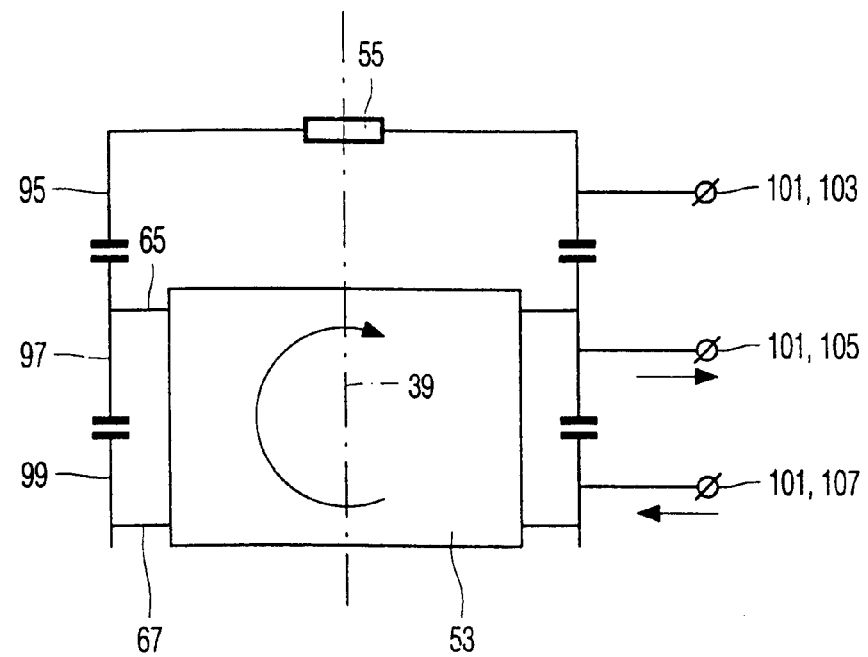

As is further shown in FIG. 3, the housing 57 of the lens system 37 includes a first part 95, a second part 97 and a third part 99, the auxiliary lens 55 being secured in a fixed position to the first part 95, the mounting element 65 being secured to the second part 97, and the mounting 67 being secured to the third part 99. The third part 99 of the housing 57 is formed by the closing yoke 79 of the second actuator 63. As schematically shown in FIGS. 6a and 6b, in the course of the manufacture of the lens system 37, the three parts 95, 97, 99 of the housing 57 are mutually manipulated by means of a manipulator 101 in such a manner that the main lens 53 and the auxiliary lens 55 are aligned relative to each other into a position in which the optical axes of the main lens 53 and the auxiliary lens 55 coincide and hence constitute the optical axis 39 of the lens system 37. To this end, the first art 95 of the housing 57 is coupled to a reference 103 of the manipulator 101, while the second part 97 of the housing 57 is coupled to a first effector 105 of the manipulator 101 and the third part 99 of the housing 57 is coupled to a second effector 107 of the manipulator 101. It is noted that in the FIGS. 6a and 6b, the manipulator 101 is not shown in further detail for the sake of simplicity. To align the main lens 53 and the auxiliary lens 55, the main lens 53 is displaced over a necessary distance relative to the auxiliary lens 55 in a direction transverse to the optical axis 39 by means of the manipulator 101, so that the main lens 53 and the auxiliary lens 55 are centered relative to each other, and the main lens 53 is tilted, relative to the auxiliary lens 55, through a necessary angle, about a tilt axis extending transversely to the optical axis 39 by means of the manipulator 101, so that the optical axes of the main lens 53 and the auxiliary lens 55 are brought into mutually parallel positions. To displace the main lens 53 relative to the auxiliary lens 55 in a direction transverse to the optical axis 39, the effectors 105 and 107 of the manipulator 101 are displaced over equal distances in an equal direction transverse to the optical axis 39, as is shown in FIG. 6a. As a result, the second part 97 of the housing 57 slides over the first part 95 of the housing 57. To tilt the main lens 53 relative to the auxiliary lens 55 about a tilt axis directed transversely to the optical axis 39, the effectors 105 and 107 of the manipulator 101 are displaced over equal distances, in opposite directions transverse to the optical axis 39 of the main lens 53, as is shown in FIG. 6b. As a result, the second part 97 of the housing 57 slides over the first part 95 of the housing 57, and the third part 99 of the housing 57 slides over the second part 97 of the housing 57. After the main lens 53 and the auxiliary lens 55 have been mutually aligned in this manner, the three parts 95, 97, 99 of the housing 57 are fixed relative to each other. Since the effectors 105, 107 of the manipulator 101 only carry out displacements in a direction transverse to the optical axis 39 during the aligning operation, the manipulator 101 may be of a simple type.

By means of the above-described optical player in accordance with the invention, during scanning the information track of the information carrier 9, information present on the information track can be read or information can be written on the information track. It is noted that the invention also relates to optical players which can only be used to read information present on an information track of an information carrier.

Finally, it is noted that in accordance with the invention, instead of the above-described mounting unit 61, the main lens 53 of the lens system 37 may include a different type of elastical deformable mounting unit by means of which the main lens 53, viewed parallel to the optical axis 39, suspended in the housing 57. An example of such a different type of mounting unit is a leaf spring.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. The scope of the invention is not limited to the embodiments, but lies in each and every novel feature or combination of features described above and in every novel combination of these features. Thus, the scope of the invention is only limited by the following claims:

We claim:

1. An optical scanning device including;
    a radiation source for supplying a radiation beam during operation of the device;

an optical lens system for focusing the radiation beam into a scanning spot on a track of an information carrier, the lens system including: a housing; an auxiliary lens secured in a fixed position in the housing; an elastically deformable mounting unit; and a main lens elastically suspended in the housing by the mounting unit to move relative to the housing in a direction parallel to an optical axis of the lens system;

a first actuator for moving the lens system parallel to the optical axis; and a second actuator for moving the main lens relative to the auxiliary lens in the direction parallel to the optical axis.

2. The device of claim 1, in which the mounting unit of the lens system includes two mounting elements which, viewed parallel to the optical axis, are arranged at some distance from each other and extend transversely to the optical axis, each mounting element, viewed parallel to the optical axis, being elastically deformable and, viewed at right angles to the optical axis, being mainly undeformable.

3. The device of claim 2, in which the mounting elements each include: a first, substantially ring-shaped part which is secured to the housing; and a second substantially ring-shaped part which is secured to the main lens, the ring-shaped parts of a first one of the mounting elements being interconnected by at least three bendable bridges extending in a plane transverse to the optical axis and being arranged at regular distances from each other, while the ring-shaped parts of a second one of the mounting elements are interconnected by at least two bendable bridges extending in a plane transverse to the optical axis.

4. The device of claim 3, in which the first mounting element and the second mounting element each include three bendable bridges mutually arranged at regular interspaces.

5. The device of claim 3, in which the bendable bridges of the mounting elements each include a uniformly bendable spoke which extends substantially in a tangential direction relative to the optical axis.

6. The device of claim 3, in which the bendable bridges of the mounting elements each include a relatively rigid strip which extends mainly in a tangential direction relative to the optical axis and is connected, via two flexible joints, to the two ring-shaped parts of the relevant mounting element.

7. The device of claim 2, in which the housing of the lens system includes three parts which are fixed relative to each other, the auxiliary lens being secured to a first one of the three parts, the first mounting element being secured to a second one of the three parts, and the second mounting element being secured to a third one of the three parts.

8. The device of claim 2, in which the second actuator belonging to the lens system is arranged, viewed parallel to the optical axis, between the two mounting elements.

9. The device of claim 8, in which the second actuator is provided with two ring-shaped permanent magnets which, viewed parallel to the optical axis, are secured, next to one another, to a substantially ring-shaped magnetic closing yoke belonging to the housing, and which, relative to the optical axis, are magnetized in opposite radial directions, and with two ring-shaped electric coils which are secured to a substantially ring-shaped non-magnetizable holder of the main lens, the coils, viewed parallel to the optical axis, being arranged next to one another, opposite the two magnets, and wound in opposite directions.

10. The device of claim 9, in which the magnetic closing yoke constitutes the third part of the housing.

11. The device of claim 1, in which:

the mounting unit of the lens system includes two mounting elements arranged at some distance from each other and extending transversely to the optical axis, each mounting element is elastically deformable in the direction of the optical axis and much less deformable in directions traverse to the optical axis;

the mounting elements each include three bendable bridges mutually arranged at regular interspaces;

the mounting elements each include: a first, substantially ring-shaped part which is secured to the housing; and a second substantially ring-shaped part which is secured to the main lens, the ring-shaped parts of a first one of the mounting elements being interconnected by the three bendable bridges extending in a plane transverse to the optical axis, while the ring-shaped parts of a second one of the mounting elements are interconnected by at least two bendable bridges extending in a plane transverse to the optical axis;

the bendable bridges of the mounting elements each include a uniformly bendable spoke which extends substantially in a tangential direction relative to the optical axis;

the bendable bridges of the mounting elements each include a relatively rigid strip which extends mainly in a tangential direction relative to the optical axis and is connected, via two flexible joints, to the two ring-shaped parts of the relevant mounting element;

the housing of the lens system includes three parts which are fixed relative to each other, the auxiliary lens being secured to a first one of the three parts, the first mounting element being secured to a second one of the three parts, and the second mounting element being secured to a third one of the three parts;

the second actuator is arranged, viewed parallel to the optical axis, between the two mounting elements;

the second actuator is provided with two ring-shaped permanent magnets which, viewed parallel to the optical axis, are secured, next to one another, to a substantially ring-shaped magnetic closing yoke belonging to the housing, and which, relative to the optical axis, are magnetized in opposite radial directions, and with two ring-shaped electric coils which are secured to a substantially ring-shaped non-magnetizable holder of the main lens, the coils, viewed parallel to the optical axis, being arranged next to one another, opposite the two magnets, and wound in opposite directions; and the magnetic closing yoke constitutes the third part of the housing.

12. An optical player comprising:

a table which can be rotated about an axis of rotation;

a radiation source for supplying a radiation beam during operation of the device;

an optical lens system for focusing the radiation beam into a scanning spot on a track of an information carrier, the lens system including: a housing; an auxiliary lens secured in a fixed position in the housing; an elastically deformable mounting unit; and a main lens elastically suspended in the housing by the mounting unit to move relative to the housing in a direction parallel to an optical axis of the lens system;

a first actuator for moving the lens system parallel to the optical axis;

a second actuator for moving the main lens relative to the auxiliary lens in the direction parallel to the optical axis; and a displacement device for displacing the lens system relative to the axis of rotation predominantly in a radial direction.

13. The device of claim 12, in which:
the mounting unit of the lens system includes two mounting elements arranged at some distance from each other and extending transversely to the optical axis, each mounting element is elastically deformable in the direction of the optical axis and much less deformable in directions traverse to the optical axis;
the mounting elements each include three bendable bridges mutually arranged at regular interspaces;
the mounting elements each include: a first, substantially ring-shaped part which is secured to the housing; and a second substantially ring-shaped part which is secured to the main lens, the ring-shaped parts of a first one of the mounting elements being interconnected by the three bendable bridges extending in a plane transverse to the optical axis, while the ring-shaped parts of a second one of the mounting elements are interconnected by at least two bendable bridges extending in a plane transverse to the optical axis;
the bendable bridges of the mounting elements each include a uniformly bendable spoke which extends substantially in a tangential direction relative to the optical axis;
the bendable bridges of the mounting elements each include a relatively rigid strip which extends mainly in a tangential direction relative to the optical axis and is connected, via two flexible joints, to the two ring-shaped parts of the relevant mounting element;
the housing of the lens system includes three parts which are fixed relative to each other, the auxiliary lens being secured to a first one of the three parts, the first mounting element being secured to a second one of the three parts, and the second mounting element being secured to a third one of the three parts;
the second actuator is arranged, viewed parallel to the optical axis, between the two mounting elements;
the second actuator is provided with two ring-shaped permanent magnets which, viewed parallel to the optical axis, are secured, next to one another, to a substantially ring-shaped magnetic closing yoke belonging to the housing, and which, relative to the optical axis, are magnetized in opposite radial directions, and with two ring-shaped electric coils which are secured to a substantially ring-shaped non-magnetizable holder of the main lens, the coils, viewed parallel to the optical axis, being arranged next to one another, opposite the two magnets, and wound in opposite directions; and
the magnetic closing yoke constitutes the third part of the housing.

14. An optical lens system comprising:
a housing;
an auxiliary lens secured in a fixed position in the housing;
an elastically deformable mounting unit; a main lens ellastically suspended in the housing by the mounting unit, the mein lens being movable relative to the housing in a direction paralell to an optical axis of the lens system;
a first actuator for moving the lens system parallel to the optical axis; and
a second actuator for moving the main lens relative to the auxiliary lens in the direction parallel to the optical axis.

15. The device of claim 14, in which:
the mounting unit of the lens system includes two mounting elements arranged at some distance from each other and extending transversely to the optical axis, each mounting element is elastically deformable in the direction of the optical axis and much less deformable in directions traverse to the optical axis;
the mounting elements each include three bendable bridges mutually arranged at regular interspaces;
the mounting elements each include: a first, substantially ring-shaped part which is secured to the housing; and a second substantially ring-shaped part which is secured to the main lens, the ring-shaped parts of a first one of the mounting elements being interconnected by the three bendable bridges extending in a plane transverse to the optical axis, while the ring-shaped parts of a second one of the mounting elements are interconnected by at least two bendable bridges extending in a plane transverse to the optical axis;
the bendable bridges of the mounting elements each include a uniformly bendable spoke which extends substantially in a tangential direction relative to the optical axis;
the bendable bridges of the mounting elements each include a relatively rigid strip which extends mainly in a tangential direction relative to the optical axis and is connected, via two flexible joints, to the two ring-shaped parts of the relevant mounting element;
the housing of the lens system includes three parts which are fixed relative to each other, the auxiliary lens being secured to a first one of the three parts, the first mounting element being secured to a second one of the three parts, and the second mounting element being secured to a third one of the three parts;
the second actuator is arranged, viewed parallel to the optical axis, between the two mounting elements;
the second actuator is provided with two ring-shaped permanent magnets which, viewed parallel to the optical axis, are secured, next to one another, to a substantially ring-shaped magnetic closing yoke belonging to the housing, and which, relative to the optical axis, are magnetized in opposite radial directions, and with two ring-shaped electric coils which are secured to a substantially ring-shaped non-magnetizable holder of the main lens, the coils, viewed parallel to the optical axis, being arranged next to one another, opposite the two magnets, and wound in opposite directions; and
the magnetic closing yoke constitutes the third part of the housing.

16. An optical scanning device comprising:
a coherent radiation source for supplying a radiation beam during operation of the device;
an optical lens system for focusing the radiation beam into a scanning spot on a track of an information carrier, the lens system including: a housing; an auxiliary lens secured in a fixed position in the housing; an elastically deformable mounting unit; and a main lens elastically suspended in the housing by the mounting unit to move relative to the housing in a direction parallel to an optical axis of the lens system;
a first actuator for moving the lens system parallel to the optical axis; and
a second actuator for moving the main lens relative to the auxiliary lens in the direction parallel to the optical axis.

17. The device of claim 16, in which the mounting unit of the lens system includes two mounting elements which, viewed parallel to the optical axis, are arranged at some distance from each other and extend transversely to the optical axis, each mounting element, viewed parallel to the optical axis, being elastically deformable and, viewed at right angles to the optical axis, being mainly undeformable.

18. The device of claim 17, in which the mounting elements each include: a first, substantially ring-shaped part which is secured to the housing; and a second substantially ring-shaped part which is secured to the main lens, the ring-shaped parts of a first one of the mounting elements being interconnected by at least three bendable bridges extending in a plane transverse to the optical axis and being arranged at regular distances from each other, while the ring-shaped parts of a second one of the mounting elements are interconnected by at least two bendable bridges extending in a plane transverse to the optical axis.

19. The device of claim 18, in which the first mounting element and the second mounting element each include three bendable bridges mutually arranged at regular interspaces.

* * * * *